United States Patent [19]

Sharma et al.

[11] Patent Number: 5,596,200
[45] Date of Patent: Jan. 21, 1997

[54] LOW DOSE MAMMOGRAPHY SYSTEM

[75] Inventors: Sukhdev R. Sharma, Carlsbad; George E. Wesbey, Del Mar, both of Calif.; Stephen Gaalema, Colorado Springs, Colo.; John A. Minteer, Vista, Calif.

[73] Assignee: PrimeX, Carlsbad, Calif.

[21] Appl. No.: 418,925

[22] Filed: Apr. 6, 1995

Related U.S. Application Data

[63] Continuation of Ser. No. 961,279, Oct. 14, 1992, abandoned.
[51] Int. Cl.$^6$ ..................................................... G01T 1/24
[52] U.S. Cl. ............................. 250/370.14; 250/370.09; 378/37
[58] Field of Search ................... 250/370.09, 370.14; 378/37; 257/656, 428, 429

[56] References Cited

U.S. PATENT DOCUMENTS

| | | |
|---|---|---|
| 3,648,258 | 3/1972 | Sewell, Jr. . |
| 3,691,389 | 9/1972 | Ellis et al. ............................ 250/370.14 |
| 3,781,827 | 12/1973 | Engeler et al. . |
| 3,916,268 | 10/1975 | Engeler et al. . |
| 3,950,738 | 4/1976 | Hayashi . |
| 4,011,442 | 3/1977 | Engeler . |
| 4,031,396 | 6/1977 | Whetten et al. . |
| 4,063,097 | 12/1977 | Barrett et al. . |
| 4,119,841 | 10/1978 | Jantsch et al. . |
| 4,120,002 | 10/1978 | Lieber . |
| 4,160,997 | 7/1979 | Schwartz . |
| 4,291,392 | 9/1981 | Proebsting . |
| 4,344,091 | 8/1982 | Gardner et al. . |
| 4,346,406 | 8/1982 | Kato et al. . |
| 4,349,739 | 9/1982 | Annis . |
| 4,383,327 | 5/1983 | Kruger . |
| 4,390,791 | 6/1983 | Hatanaka et al. . |
| 4,397,002 | 8/1983 | Brosch et al. . |
| 4,407,010 | 9/1983 | Baji et al. . |
| 4,413,280 | 11/1983 | Adlerstein et al. . |
| 4,413,283 | 11/1983 | Aoki et al. . |
| 4,415,980 | 11/1983 | Buchanan . |
| 4,441,125 | 4/1984 | Parkinson . |
| 4,471,378 | 9/1984 | Ng . |
| 4,472,728 | 9/1984 | Grant et al. ............................ 250/370.09 |
| 4,486,778 | 12/1984 | Risch et al. . |
| 4,486,835 | 12/1984 | Bai et al. . |
| 4,504,865 | 3/1985 | Nishizawa et al. . |
| 4,675,739 | 6/1987 | Catchpole . |
| 4,700,076 | 10/1987 | Dorman et al. ............................ 250/370.09 |
| 4,709,382 | 11/1987 | Sones ............................................ 378/62 |

(List continued on next page.)

FOREIGN PATENT DOCUMENTS

| | | |
|---|---|---|
| 0229497 | 7/1987 | European Pat. Off. . |
| 0571135A2 | 11/1993 | United Kingdom . |

OTHER PUBLICATIONS

R. H. Dyck, "Technical Note on X-Ray Imaging with Fairchild CCD Image Sensors," Compendium of Technical Notes supplied by Fairchild Camera & Instrument, Inc. 4001 Miranda Ave., Palo Alto, CA, Jun. 1981.

M. Blouke et al., "Charge-Coupled Device Image Sensors," *Arms Control Verification: The Technologies That Make it Happen* K. Tsipis, Editor, Brasseys Inc., McLean, VA, Apr. 1986, pp. 104–120.

(List continued on next page.)

*Primary Examiner*—Carolyn E. Fields
*Attorney, Agent, or Firm*—Wilson, Sonsini, Goodrich & Rosati

[57] ABSTRACT

The x-ray imaging system comprises an x-ray source for producing an x-ray beam and an x-ray detector. The x-ray detector comprises a solid state integrated circuit having a silicon substrate. The detector is constructed as a PiN diode with the voltage bias direction parallel to the direction of incident radiation. A tissue sample, such as a breast, is positioned between the x-ray source and x-ray detector. The x-ray detector directly receives the x-ray photons transmitted through the tissue and produces electrical signals. The detector signals are processed to provide a digital image of the tissue sample.

23 Claims, 4 Drawing Sheets

U.S. PATENT DOCUMENTS

| | | | |
|---|---|---|---|
| 4,794,257 | 12/1988 | Baba et al. | 250/370.09 |
| 4,810,875 | 3/1989 | Wyatt . | |
| 4,879,734 | 11/1989 | Schreckendgust et al. . | |
| 4,881,124 | 11/1989 | Yokouchi et al. . | |
| 4,891,521 | 1/1990 | Danus | 250/370.09 |
| 4,901,337 | 2/1990 | Fujimoto . | |
| 4,905,265 | 2/1990 | Cox et al. . | |
| 4,937,453 | 6/1990 | Nelson | 250/370.09 |
| 4,948,974 | 8/1990 | Nelson et al. . | |
| 4,958,363 | 9/1990 | Nelson et al. | 378/85 |
| 5,003,571 | 3/1991 | Kido et al. . | |
| 5,043,582 | 8/1991 | Cox et al. | 250/366 |
| 5,079,698 | 1/1992 | Grenier et al. . | |
| 5,101,421 | 3/1992 | Nishiki . | |
| 5,124,558 | 6/1992 | Soltani et al. | 378/37 |
| 5,132,541 | 7/1992 | Conrads et al. | 250/370.09 |
| 5,220,170 | 6/1993 | Cox et al. | 250/370.09 |
| 5,247,562 | 9/1993 | Steinbach | 378/119 |
| 5,379,336 | 10/1994 | Kramer et al. | 378/98.85 |

OTHER PUBLICATIONS

J. Janesick et al., "Backside Charging of the CCD," Conference: Solid State Imaging Arrays, San Diego, CA, Aug. 22–23, 1985, in *Proceedings of SPIE –The International Society for Optical Engineering* v.570, Bellingham, WA, pp. 46–79.

J. Eberhart, "The CCD: New Eye on the Sky," *Science News*, vIII, Science Service Inc., Washington, D.C., Mar. 12, 1977, pp. 169 and 173.

D. Norris et al., "Radiation Effects on the Design of the Galileo Imaging System," paper presented at the Conference *IEEE Transactions on Nuclear Science, IEEE Annual Conference on Nuclear and Space Radiation Effects*, Las Vegas, NV, Jul. 1982, pp. 1–7.

Gaalema, Steve, "Low Noise Random–Access Readout Technique For Large Pin Detector Arrays", IEEE Transaction on Nuclear Science, vol. NS–32, No. 1, Feb. 1985, pp. 417–418.

"Direct Soft X–Ray Response of a Charge Coupled Image Sensor", Koppel Review of Scientific Inst., vol. 48, No. 6, Jun. 1977, pp. 669–672.

Janesick et al., "CCD Advances for X–ray Scientific Measurements in 1985", Nov. 1985, X–Ray Instrumentation for Astronomy, pp. 1–17.

Stern et al., "Evaluation of a Virtual Phase Charged––Coupled Device as an Imaging X–ray Spectrometer", Rev. Sci. Inst., Feb. 1983, pp. 198–205.

Janesick et al., "Flash Technology for CCD Imaging in the UV", SPIE, UV Technology, San Diego, Aug. 22, 1986, pp. 1–20.

Janesick et al., "Charged–Coupled Device Advances for X–ray Scientific Application in 1986", Optical Engineering, Feb. 1987, vol. 26, No. 2, pp. 156–166.

Norris et al., "Progress in 800X800 CCD Imager Development and Applications", Proceedings of SPIE –The International Society for Optical Engineering v. 311, 1982, pp. 42–45.

Janesick et al., "The Potential of CCDs for UV and X–Ray Plasma Diagnostics", Preprint: Rev. Sci. Inst., pp. 1–18.

McGrath et al., "An 8 Megapixel/Sec 800X800 Virtual Phase CCD Imager for Scientific Applications", International Electron Devices Meeting, 1983, published by IEEE, New York, New York, pp. 489–491.

Janesick et al., "The CCD Flash Gate", SPIE Instrumentation in Astronomy VI, Tucson, Arizona, Mar. 1986, pp. 1–40.

Norris et al., "Progress in 800X800 CCD Imager Development and Applications", Proceedings of the SPIE –The International Society for Optical Engineering, vol. 311, 1981, pp. 42–45.

Jerome Kristian et al., "Charge–Coupled Devices in Astronomy", an Article from Scientific American, vol. 247, No. 4, Oct. 1982, pp. 66–74.

Klaasen et al., "Charge–Coupled Device Television Camera for NASA's Galileo Mission to Jupiter", Optical Engineering, May/Jun. 1984, pp. 334–342.

Blouke et al., "800X800 Charge–Coupled Device Image Sensor", Optical Engineering, Sep./Oct. 1983, vol. 22, No. 5, pp. 607–614.

Janesick et al., "CCD Charge Collection Efficiency and the Photon Transfer Technique", Proceedings of the SPIE –The International Society for Optical Engineering, vol. 570, 1985, pp. 7–19.

Janesick et al., "The Future Scientific CCD", Proceedings of the SPIE –The International Society for Optical Engineering, vol. 501, 1984, pp. 2–31.

Janesick et al., "A Virtual Phase Imager for Galileo", SPIE, vol. 290, Jun. 1981, pp. 1–9.

Janesick et al., "Quantum Efficiency Model for the CCD Flash Gate", IEDM, IEEE, Dec. 1986, pp. 1–3.

Janesick et al., "Flash Technology for CCD Imaging in the UV", SPIE, UV Technology, Aug. 1986, pp. 1–20.

Blouke et al., "Large Area CCD Image Sensors for Scientific Applications", Proceedings of the SPIE –The International Society for Optical Engineering, vol. 570, 1985, pp. 82–88.

Killiany, "Radiation Effects in Silicon Charge–Coupled Devices", *Charge Coupled Devices*, published by Springer Verlag, Berlin, West Germany, published 1980, pp. 147–176.

Kimme–Smith et al., "Digital Mammography A Comparison of Two Digitization Methods", Investigative Radiology, vol. 24, Nov. 1989, pp. 869–875.

Holdsworth et al., "Time–Delay Integration Charge––Coupled Device Camera For Slot–Scanned Digital Radiography", Med. Phys., vol. 17, No. 5, Sep./Oct. 1990, pp. 876–886.

Nishikawa et al., "Scanned–Projection Digital Mammography", Med. Phys., vol. 14, No. 5, Sep./Oct. 1987, pp. 717–727.

Jarlman et al., "Digital Luminescence Mammography–Early Clinical Experience", Acta Radiologica, vol. 32, 1991, pp. 110–113.

Fritz et al., "A Digital Radiographic Imaging System For Mammography", Investigative Radiology, vol. 21, Jul. 1986, pp. 581–583.

Rogulski et al., "Improved Reconstructed Resolution For Spect Imaging: Simulation Results", Journal of Nuclear Medicine Abstracts, vol. 33, No. 5, May 1992, p. 851.

Barber et al., "A Novel Design For Gamma–Ray Imaging Using A Multiplexer And Semiconductor Detectors", Journal of Nuclear Medicine Abstracts, vol. 33, No. 5, May 1992 (Abstract No. 752).

LOW DOSE MAMMOGRAPHY SYSTEM

The present application is a continuation of U.S. application Ser. No. 07/961,279, filed Oct. 14, 1992, now abandoned.

BACKGROUND OF THE INVENTION

1. Field of The Invention

This invention relates to x-ray imaging systems and particularly to a primary x-ray imaging system which utilizes a solid state x-ray detector to directly convert x-ray photons to usable electrical signals to form an image.

2. Discussion of Related Art

Since the discovery of x-rays and their first application in radiology for diagnostic imaging, some hundred years ago, the basic x-ray imaging systems and methodologies have stayed essentially unchanged. X-ray imaging involves transmission through the object by an x-ray beam and recording the image on photographic film producing a shadowgram. Computed Tomography (CT) is an exception and a special case because it produces a numerically computed image of a cross section of the object instead of a shadowgram.

Presently, x-ray imaging systems are utilized in a variety of applications, both as medical diagnostic tools and for industrial quality control. The most common form of x-ray detection resides in the use of silver halide film. However, the use of such film requires chemical developing steps. In addition, this film is expensive, thus increasing the cost of x-ray images produced in this manner.

For clinical diagnosis and routine screening of asymptomatic female population, screen-film mammography today still represents the state-of-the-art for early detection of breast cancer. However, screen-film mammography has limitations which reduce its effectiveness. Because of the extremely low differentiation in radiation absorption densities in the breast tissue, image contrast is inherently low. Film noise and scatter radiation further reduce contrast making detection of microcalcifications difficult in the displayed image. Film gradient must be balanced against the need for wider latitude.

Computed Radiography (CR) systems can be broadly categorized as primary digital and secondary digital systems. Primary digital systems imply direct conversion of the incident radiation on the sensor into usable electrical signals to form a digital image. Secondary digital systems, on the other hand, involve an intermediary step in the conversion of radiation to a digital image. For example, in digital fluoroscopy, image intensifiers are used for intermediary conversion of x-radiation to a visible image which is then converted to a digital image using a video camera. Similarly, digital x-ray systems using photostimulated luminescence (PSL) plates, first store the virtual image as chemical energy. In a second step, the stored chemical energy is converted into electrical signals using a laser to scan the PSL plate to form a digital image. Furthermore, various schemes using silicon photodiode arrays in scanning mode for CR systems have been employed. However, these photodiode arrays require intermediate phosphor screens to convert the x-radiation to visible light, because of the steep fall-off in quantum efficiency (sensitivity) of the arrays at energies above 10 KeV. The above described secondary digital systems have several disadvantages, including loss in image resolution.

Recent technological advances have made it possible to overcome these difficulties by allowing semiconductor x-ray detectors to be used to generate usable x-ray images. High quality semiconductor x-ray detectors have been known for many years, but these detectors require a very sensitive preamplifier to produce a useable signal. With recent advances in high density analog complementary metal oxide semiconductor (CMOS) integrated circuit technology and high density interconnection between semiconductor chips, the integration of thousands of these detector elements with preamplifiers on a single hybrid integrated circuit called a sensor chip is now possible. For example, Cox et al. U.S. Pat. No. 4,905,265, whose disclosure is incorporated herein by reference, discloses a semiconductor detector having an absorbing layer located between the x-rays from an object and the x-ray semiconductor sensors.

SUMMARY OF THE INVENTION

The above-mentioned disadvantages are overcome by the present invention which is an x-ray imaging system comprising an x-ray source to expose a sample, such as a breast, and a semiconductor detector to directly detect x-rays from the sample.

In another embodiment, the present invention includes a method of imaging an object, such as a breast, which comprises the steps of: (1) generating a beam of x-rays; then (2) exposing the object to the beam of x-rays; and then (3) directly detecting x-rays from the object with a semiconductor detector to form a digital image.

DESCRIPTION OF THE PREFERRED EMBODIMENT

It has now been discovered how to develop digital x-ray imaging systems or Computed Radiography (CR) using semi-conductor radiation sensors with higher sensitivity, wide dynamic range and employing image processing technologies, which promise unmatched performance and benefits over the screen-film mammography.

The advantages of such a digital x-ray imaging system are illustrated in Table 1 below which compares the attributes of x-ray film imaging with the present invention.

TABLE 1

Comparison of Screen-Film and Present Invention's Design Features

| | Screen-Film | Invention |
|---|---|---|
| Image Receptor | Photographic Film | Semiconductor Sensors |
| Output Image | Shadowgram | Digital |
| Image Storage | Photographic Film | Magnetic/Optical Disk |
| Radiation Dose/Mammogram | 110 mRad (with grid) | <16 mRad |
| Image Resolution | 15 lp/mm | 10–20 lp/mm |

TABLE 1-continued

Comparison of Screen-Film and Present Invention's Design Features

|  | Screen-Film | Invention |
| --- | --- | --- |
| Image Contrast Enhancement | No | Yes |
| Color/Gray Scales | No | Yes |
| Edge Enhancement | No | Yes |
| Scatter/Mottle Noise | Yes | No |
| Motion Blurring | Minimal | Minimal |
| Operating Costs | High | Low |

It has been discovered that the present invention produces many advantages over prior art x-ray imaging systems.

For example, the present invention significantly enhances clinical image quality so as to eliminate the need for repeated exposures due to poor film image quality caused by such factors as radiation scatter noise, fog, blurring, mottle and artifacts.

The present invention provides a digital radiography technique able to perform quantitative radiography through image digitization and allows for useful enhancement techniques, such as edge enhancement of microcalcifications and the transmission of mammograms to remote sites over computer networks.

The present invention advantageously reduces the absorbed radiation dose received by a patient by, at least a factor of seven as compared to screen-film mammography. This facilitates mammography for routine screening of asymptomatic population in the 35 years and older age group by significantly enhancing the benefit to risk equation.

The present invention also significantly reduces the absorbed dose to the patients during a needle localization biopsy procedure which can require as many as 10 exposures.

Another advantage of the present invention is that it provides improved storage and retrieval of image data through the use of standard magnetic or optical disk media instead of the photographic film.

Another advantage of the invention is to provide a device which is capital cost competitive with current x-ray imaging systems and which reduces the cost in materials and processing time by eliminating photographic film and associated chemicals, dark rooms and other peripherals, as well as reducing technician's time for film processing.

Figure 1:
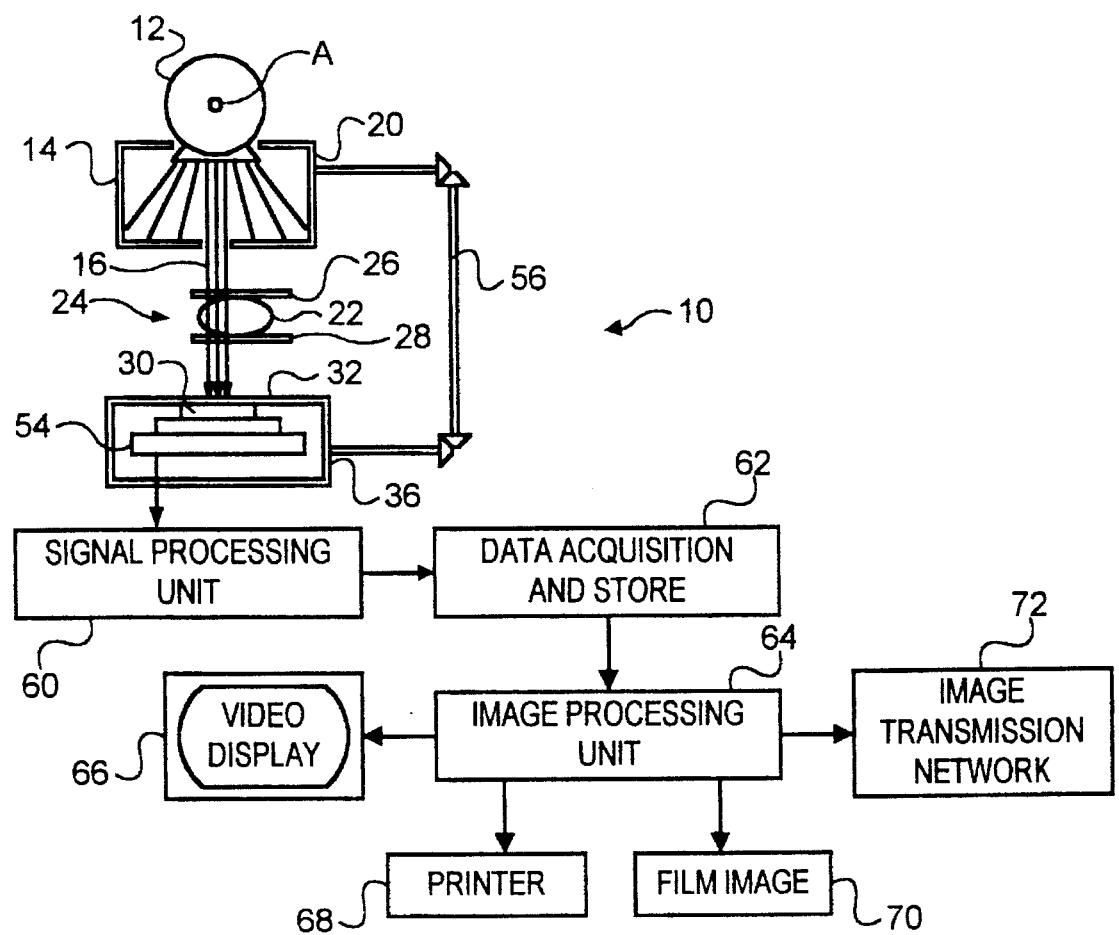
FIG. 1 is a schematic diagram of an embodiment of the x-ray imaging system of the present invention.

An embodiment of a low dose, primary digital x-ray system for clinical mammography and which contains the advantages mentioned above is shown schematically in FIG. 1. FIG. 1 shows the x-ray system 10 which comprises an x-ray source 12. Source 12 preferably consists of a stationary molybdenum target x-ray tube in combination with a molybdenum filter producing a "bichromatic" output centered at the energies of approximately 18 Kev and approximately 20 KeV and producing energies in the range of from greater than approximately 18 KeV to less than approximately 20 KeV. Sources such as these are well known and manufactured by, for example, True-Focus, located at Los Gatos, Calif. and Eureka, located at Chicago, Ill. The source may be constructed to emit a fan-shaped beam. It is further contemplated to use an x-ray source 12 capable of generating x-rays either having energies ranging from greater than approximately 0 KeV to less than approximately 20 KeV for breast radiography; or ranging from greater than approximately 0 KeV to less than 50 KeV or ranging from greater than approximately 0 KeV to less than approximately 85 KeV for non-breast radiography.

The x-rays generated by source 12 are then collimated by collimator 14 to produce a fan shaped beam 16 in a well known manner. Collimator 14 comprises a rectangular slit 18 preferably having the dimensions of 0.32×200 mm. Collimator 14 and slit 18 are integrally contained in a common housing 20 which moves with respect to the stationary x-ray source 12.

Figure 2:
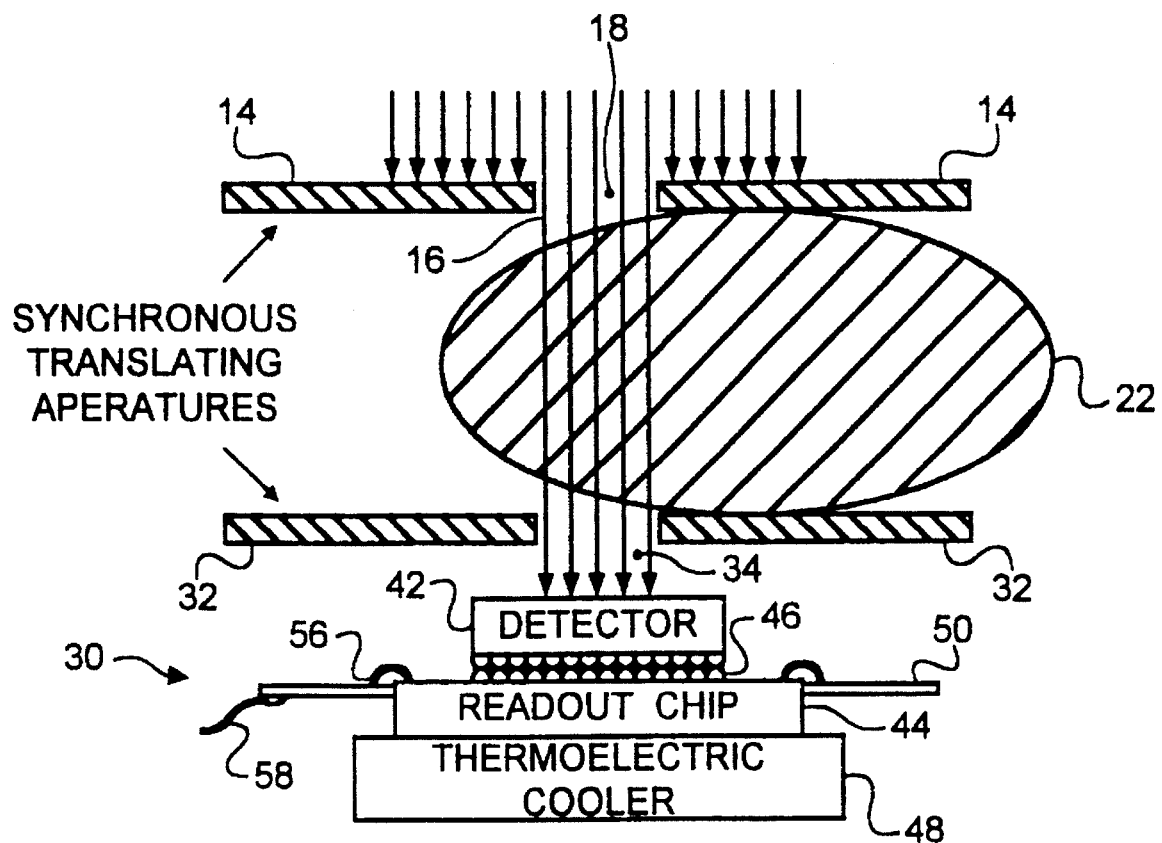
FIG. 2 is an enlarged view of the x-ray imaging system of FIG. 1.

The fan shaped beam 16 is directed toward a tissue sample 22, such as a breast. The system can also be used to image other body parts, such as a hand, an elbow, a foot, a knee, an infant's chest, abdomen or skull. As shown in FIGS. 1 and 2, the breast is held in position by a sample holder 24, comprising top and bottom plates 26 and 28, respectively. Plates 26 and 28 are well known in the art and are used to compress the breast during exposure to the beam 16.

After the breast 22 is exposed to the x-rays, those collimated x-rays emanating from the breast are detected by detector 30. In the embodiments of FIGS. 1 and 2, the x-rays transmitted through the breast 22 are first directed through a second collimator 32 having a rectangular receptor slit 34 aligned with the first rectangular slit 18 and having approximately the same dimensions as a first rectangular slit 18, preferably having the dimensions 0.32×200 mm. The x-rays directed through the second slit 34 are then detected by detector 30. Second collimator 32 is integrally contained in a movable housing 36. Housing 36 also contains detector 30 which is stationary with respect to housing 36.

Detector 30 comprises an array of sensors, preferably consisting of about 30,000 semiconductor sensor elements 38 arranged in a row/column configuration. Each sensor element 38 preferably is approximately 0.04×0.04 mm in size. Each sensor element 38 comprises a high quality semiconductor element capable of counting the number of x-ray photons it absorbs.

Figure 3:
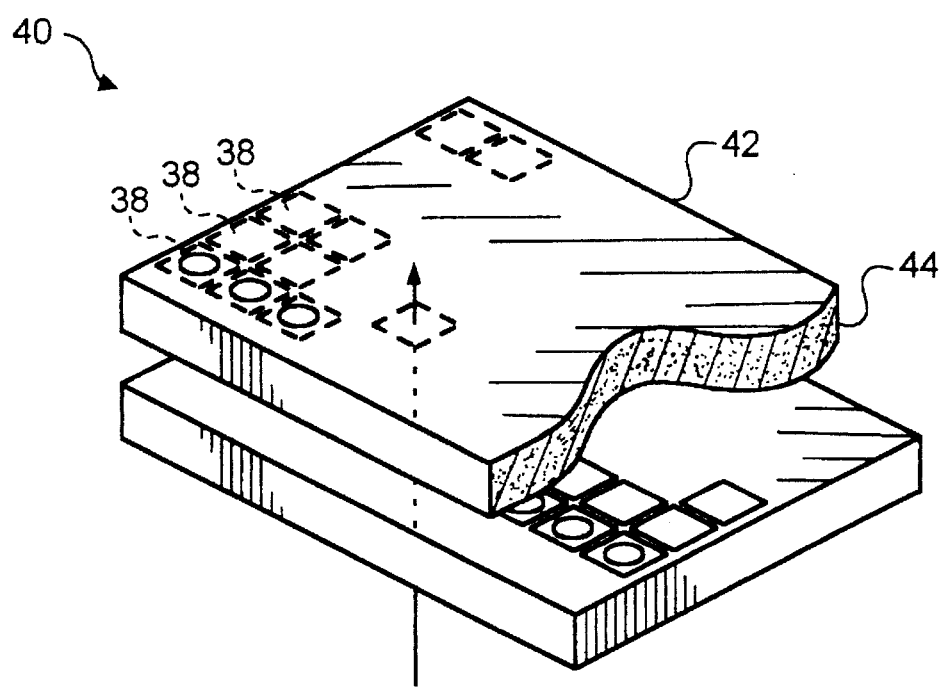
FIG. 3 is an exploded view of a sensor chip to be used in the embodiment of FIG. 1.
Figure 3A:
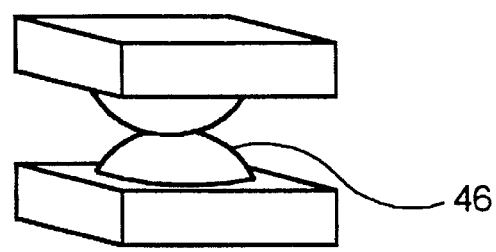
FIG. 3a illustrates the metal bumps between the detector layer and readout chip.

In a preferred embodiment shown in FIG. 3 and FIG. 3a, the individual sensors 38 are manufactured into a hybrid sensor chip 40. Hybrid sensor chip 40 comprises a semiconductor detector layer 42 interconnected with a readout chip 44. Hybrid sensor chip 40 allows the integration of thousands of sensitive preamplifiers on the readout chip 44 with the sensors 38 resulting in the generation of a usable imaging signal. The sensors 38 are first fabricated from a semiconductor detector layer 42, such as N-type silicon (approximately 5,000 Ω-cm) to form a silicon PiN diode detector. For silicon the preferred thickness of the layer 42 is approximately 0.5 mm to 0.75 mm so as to absorb the majority of incident x-rays having an energy of 18–20 KeV. The thickness of the detector would depend on the type of semiconductor material and the energy of x-rays desired to be detected. The sensors 38 preferably are arranged in an array having 450 rows by 8 columns resulting in a chip having a length of approximately 18 mm. Of course, other array configurations are possible depending on the particular requirements of an imaging system.

The other half of the hybrid sensor chip 40 comprises a heavily doped readout chip 44. Readout chip 44 can be made by a standard silicon analog CMOS integrated circuit process. The readout chip 44 has a design containing over 3,000 preamplifiers and sample and hold circuits as well as address and multiplexer circuits. The CMOS technology allows for individual low noise preamplifiers to be placed under each 0.04 mm square detector element as shown in FIG. 3.

Once the preamplifiers of readout chip 44 are aligned with a corresponding sensor element 38 in detector layer 42, high density interconnection between readout chip 44 and detector layer 42 is accomplished by hybridizing indium metal bumps 46 between the corresponding sensors and preamplifiers. The indium metal bumps 46 between the detector layer 42 and readout chip 44 conduct the minute amount of charge produced by each x-ray photon absorbed in the semiconductor sensor 38 to a corresponding preamplifier in the readout chip 44.

In determining the desired semiconductor materials one must consider such factors as ease of fabrication, x-ray absorption, and operating temperature. For mammographic applications, two alternative detector materials, silicon and gallium arsenide, are preferred. Silicon detectors are much easier to fabricate than GaAs detectors, however, the silicon x-ray photon quantum absorption coefficient is much lower than GaAs. This means that to detect the majority of incident x-rays at an energy of 18 Kev, a silicon detector must be 0.5 mm or more in thickness. Fortunately, high purity silicon PiN diode detector arrays can be made at this thickness. Moderate cooling of the silicon detectors (to about 0° Celsius) may also be required, but this can be achieved with a reliable solid state thermoelectric cooler assembly 48, as shown in FIG. 2. Furthermore, for applications in a primary x-ray digital imaging system having x-ray energies greater than approximately 25 KeV, sensor materials with much higher x-ray absorption properties are needed. Consequently, GaAs, cadmium telluride, CdZnTe, indium antimonide, and germanium are detector materials to be used at energies greater than 25 KeV.

Figure 4:
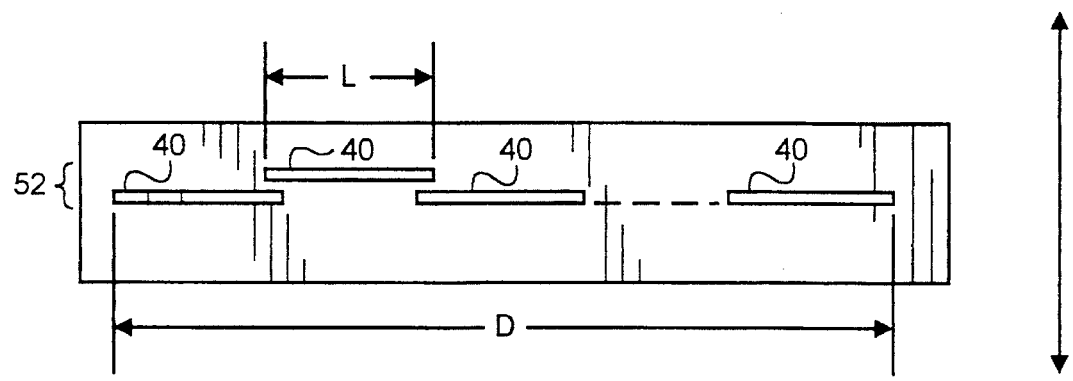
FIG. 4 is a view of a single row of a detector array to be used in the x-ray imaging system of FIG. 1.
Figure 4A:
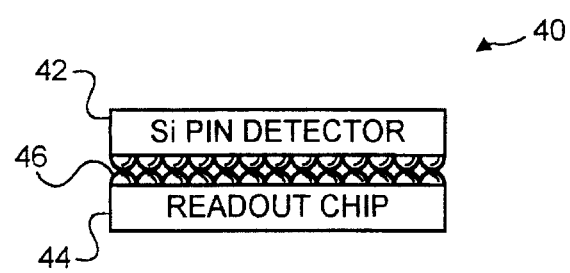
FIG. 4a illustrates one sensor chip used in the array.

Once the hybrid sensor chips 40 are manufactured, the detector 30 for the present invention can be manufactured. As shown in FIG. 2, the hybrid sensor chips 40 are attached to a flat fan-out board 50 via the readout chip 44 in a manner well known in the art. A plurality of hybrid sensor chips 40 are arranged on the board 50 as shown in FIG. 4. Each sensor chip 40 as illustrated in FIG. 4a constitutes a linear detector array on the board. Eight chips 40 are positioned in an offset manner to produce a detection row 52, wherein the length, L, of each sensor chip 40 is approximately 18 mm and the length, D, of the row is approximately 140 mm. Preferably, 450 rows are then formed wherein the separation between each row is approximately 1 mm. Thus, a 450×8 semiconductor array detector is formed. Of course the number of rows and columns of detectors and their length and separation can be changed depending on the specific design requirements of the x-ray imaging system. For example the length of the row and the number of rows can be any desired value up to the limit of the mechanical scan. It is also contemplated to have the sensor chips 40 placed in an array-like fashion as described above, except on a concavely curved board. The curved array allows for correction of the fact that for a flat array x-rays near the edge of the fan-shaped beam 16 travel a larger distance to the detectors than do x-rays near the center of the beam 16. Curving the array equalizes the distance traveled and results in an improved image.

With the detector 30 in place it is possible to generate a digital image of the sample or breast 22. Imaging is accomplished by scanning the fan-shaped beam 16 across the breast 22 and having the individual sensors 38 directly detect the number of x-ray photons transmitted through the breast 22. The output of each semiconductor sensor 38 is directly in the form of electric charge proportional to the breast tissue attenuated radiation intensity on each pixel of the sensor array. This output when processed forms the digital image.

A full image of the breast 22 is accomplished by having the fan-shaped x-ray beam 16 and second rectangular slit 34 synchronously move in a linear manner while the breast 22 and detector array 30 are stationary. Linear motion of the beam 16 is achieved by having rectangular slit 18 move relative to stationary x-ray source 16. Linear motion of the housing 36, detector 30, and second rectangular slit 34 is provided by a detector drive and detector drive electronics 54 which are well known in the art. Furthermore, synchronous linear motion of the beam 16, both rectangular slits 18 and 34, and detector 30 is accomplished by having a mechanical coupling 56 connected to housings 20 and 36 in a well known manner. The rows 52 of detector 30 are oriented so as to be parallel to the length-wise dimension of the rectangular slits 18 and 34. Furthermore, the beam 16 and rectangular slits 18 and 34 move in a direction perpendicular to the width of the beam 16 and the length of the detector row 52. Scanning is completed once all areas of the breast 22 have been exposed to the fan-shaped beam 16.

It is also contemplated to have the x-ray source 12 and collimator 14 be integrally connected to each other and scan the breast 22 by having the x-ray source 12 and collimator 14 rotate about an axis A shown in FIG. 1 along an arcuate path. The housing 36 and detector 30 would also move in an arcuate path via coupling 56.

As the beam 16 exposes the breast 22 signals from sensors 38 are directed to the preamplifiers in the readout chip 44. The outputs of the preamplifiers of the readout chip 44 are multiplexed to a single output from the integrated circuit in readout chip 44. The single output is then sent to detector drive electronics 54 (FIG. 1) and data acquisition electronics via wire bonds 56 and cable 58 (FIG. 2).

Since the image generated is isomorphic to the matrix of digital numbers generated during the scan, it can be processed by a signal processing unit 60 with suitable software. For example, the signal-to-noise ratio of the signals can be improved through processing. This is apparent once one realizes that as the x-ray beam collimation slit 18 and the receptor slit 34 are moved to scan the image, the same data is acquired from each of the 8 elements in a given row 52. By correcting for the time lag from the first element of the row to the trailing elements in the scan, the signals from each of the 8 elements can be integrated to improve the signal to noise ratio. This process is called Time Delay and Integration (TDI). TDI allows an x-ray beam width of 0.32 mm (instead of 0.04 mm, the element size) to be used effectively. The wider beam eases mechanical tolerances on the slit and alignment to the sensor chip, as well as reducing the required time to complete a scan for a given x-ray tube power output. This time is estimated to be 5 seconds for a 100 mA x-ray tube current.

The data from signal processing unit 60 are then sent to a data acquisition and store station 62. Station 62 advantageously stores and archives on standard magnetic or optical disk media instead of photographic film.

The data from storage station 62 is then sent to image processing unit 64 in which a variety of processing operations can be performed on the image. For example, the image processing unit can perform the image manipulations of: (1) magnification; (2) contrast enhancement and windowing; (3) enhancing sharpness and edge gradients; (4) attaching gray or color scales to enhance image quality; and (5) image subtraction.

The image generated by image processing unit 64 can be displayed on a video display 66, a printer 68, on film 70, or sent via image transmission network 72, which can include satellites or computer networks to send image data from remote radiology laboratories to a centrally located radiologist for virtually real time image interpretation and diagnosis.

The invention can be adapted for applications in other areas of clinical imaging. Specifically, the invention can be adapted for: (1) low dose, low cost applications in breast computed tomography (CT); (2) use in intelligent software for computer aided diagnosis (CAD); (3) the stereotactic computerized placement of biopsy needle; and (4) radiation control, monitoring and non-invasive imaging systems for applications in nuclear medicine.

The foregoing description is provided to illustrate the invention, and is not to be construed as a limitation. Numerous additions, substitutions and other changes can be made to the invention without departing from its scope as set forth in the appended claims.

We claim:

1. An x-ray mammography system comprising:
   an x-ray source generating x-rays along an emission axis;
   a breast holder, to hold a breast in position to be exposed to x-rays from said x-ray source;
   a semiconductor detector to directly detect x-rays from said x-ray source, wherein said semiconductor detector comprises:
   a layer comprising a sensor to directly detect said x-rays from said breast;
   a readout chip interconnected with said layer;
   wherein said sensor comprises:
   a PiN detector having a first terminal surface positioned so as to be exposed to x-rays with said emission axis orthogonal to said first terminal surface.

2. The x-ray imaging system of claim 1, wherein said readout chip and said layer are interconnected by indium bumps.

3. The x-ray mammography system of claim 1, wherein said semiconductor detector comprises silicon.

4. The x-ray mammography system of claim 1, wherein said semiconductor detector comprises gallium arsenide.

5. The x-ray imaging system of claim 1, wherein said semiconductor detector comprises cadmium telluride.

6. The x-ray imaging system of claim 1, wherein said semiconductor detector comprises CdZnTe.

7. The x-ray imaging system of claim 1, wherein said semiconductor detector comprises germanium.

8. The x-ray mammography system of claim 1, wherein said semiconductor detector detects x-rays in the energy range of from greater than approximately 18 KeV to less than approximately 20 KeV.

9. The x-ray mammography system of claim 1, further comprising an image processing unit to receive signals from said detector to generate an image of said breast.

10. The x-ray mammography system of claim 1, wherein said semiconductor detector
    is positioned to receive x-rays transmitted through said breast.

11. A method of imaging a breast, comprising the steps of:
    generating a beam of x-rays along an emission axis;
    exposing said breast to said beam of x-rays;
    directly detecting x-rays from said breast with a silicon semiconductor detector having a layer having one or more sensors positioned to directly detect said x-rays from said breast, with said silicon semiconductor detector formed as a PiN detector having a first surface positioned so as to be exposed to said generated beam of x-rays and having a second surface parallel to said first surface and disposed 0.5 millimeter or more from said first surface, wherein said first surface is positioned to be orthogonal to said emission axis.

12. A method of imaging a breast, comprising the steps of:
    generating a beam of x-rays along an emission axis;
    exposing said breast to said beam of x-rays;
    directly detecting x-rays from said breast with a semiconductor detector having a layer having one or more sensors to directly detect said x-rays from said breast, with said semiconductor detector formed as a PiN detector, and operated to have a voltage bias along a bias axis, with said bias axis parallel to said emission axis.

13. The method of imaging of claim 12, wherein said semiconductor detector comprises silicon.

14. The method of imaging of claim 12, wherein said semiconductor detector comprises gallium arsenide.

15. The method of imaging of claim 12, wherein said semiconductor detector comprises cadmium telluride.

16. The method of imaging of claim 12, wherein said semiconductor detector comprises CdZnTe.

17. The method of imaging of claim 12, wherein said semiconductor detector comprises germanium.

18. The method of imaging of claim 12, wherein said detecting step comprises detecting x-rays in the energy range of from greater than approximately 18 KeV to less than approximately 20 KeV.

19. The method of imaging of claim 12, further comprising the steps of:
    reading signals from said detector; directing said signals read from said detector to an image processor; and
    generating an image of said breast from said signals directed to said image processor.

20. An x-ray mammography system comprising:
    an x-ray source, in a source housing with a source aperture scannable in a linear direction, generating x-rays along an emission axis;
    a breast holder, to hold a breast in position to be exposed to x-rays from the x-ray source;
    a semiconductor detector, in a detector housing with a detector aperture scannable in a linear direction, to directly detect x-rays from the x-ray source, wherein the semiconductor detector comprises:
    a layer comprising a sensor to directly detect the x-rays from said breast;
    a readout chip interconnected with said layer, wherein the sensor comprises:
    a PiN detector having a first terminal positioned so as to be exposed to x-rays with said emission axis orthogonal to the first terminal surface.

21. The x-ray mammography system of claim 20, further comprising a mechanical coupler for synchronizing the linear motion of the source and detector apertures.

22. The x-ray mammography system of claim 20, wherein the x-rays includes a fan-shaped beam and the semiconductor detector includes a linear array of detectors along a concave curve corresponding to the fan-shaped beam.

23. The x-ray mammography system of claim 20, further comprising a signal processing unit which processes signals from the semiconductor detector using time delay and integration.

* * * * *